(12) United States Patent
Djenguerian et al.

(10) Patent No.: US 7,990,125 B2
(45) Date of Patent: *Aug. 2, 2011

(54) METHOD AND APPARATUS TO LIMIT OUTPUT POWER IN A SWITCHING POWER SUPPLY

(75) Inventors: Alex B. Djenguerian, Saratoga, CA (US); Stefan Bäurle, San Jose, CA (US); Kent Wong, Fremont, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/488,427

(22) Filed: Jun. 19, 2009

(65) Prior Publication Data
US 2009/0256544 A1 Oct. 15, 2009

Related U.S. Application Data

(63) Continuation of application No. 12/052,609, filed on Mar. 20, 2008, now Pat. No. 7,567,070, which is a continuation of application No. 11/732,209, filed on Apr. 2, 2007, now Pat. No. 7,359,225, which is a continuation of application No. 11/179,144, filed on Jul. 11, 2005, now Pat. No. 7,215,107.

(51) Int. Cl.
*G05F 1/575* (2006.01)
*H02H 7/122* (2006.01)

(52) U.S. Cl. .................... 323/284; 323/285; 363/56.1

(58) Field of Classification Search ............. 363/18, 363/20, 21.04, 21.09, 21.1, 21.12, 21.17, 363/21.18, 56.09, 56.1, 97; 323/282, 284, 323/285, 908; 361/87, 93.9

See application file for complete search history.

(56) References Cited

U.S. PATENT DOCUMENTS
5,285,366 A 2/1994 Zaretsky
(Continued)

FOREIGN PATENT DOCUMENTS
EP 1298778 4/2003

OTHER PUBLICATIONS
European Search Report, EP 06253510, mailed May 2, 2008, 8 pages.
(Continued)

*Primary Examiner* — Gary L Laxton
(74) *Attorney, Agent, or Firm* — Blakely Sokoloff Taylor & Zafman LLP

(57) ABSTRACT

Techniques are disclosed to adjust a current limit in a switching regulator. One example switching regulator includes a comparator having first and second inputs and an output. The first input of the comparator is adapted to sense a current flow through a switch and the second input of the comparator is adapted to sense a variable current limit value. A controller is coupled to the output of the comparator and to the switch to control switching of the switch to regulate an output of a power supply in response a feedback signal. The controller disables the switch if the sensed current flow through the switch is greater than the sensed variable current limit value. The variable current limit value is set to a first variable current limit value by the controller in response to an input line voltage of the power supply if there is not an over current condition during a first switching cycle that occurs after a skipped switching cycle of the switch. The variable current limit value is set to a second variable current limit value by the controller in response to the input line voltage if there is the over current condition during the first switching cycle that occurs after the skipped switching cycle.

6 Claims, 7 Drawing Sheets

U.S. PATENT DOCUMENTS

| | | | |
|---|---|---|---|
| 6,313,976 B1 * | 11/2001 | Balakrishnan et al. | 361/79 |
| 6,333,624 B1 | 12/2001 | Ball et al. | |
| 6,351,398 B1 | 2/2002 | Balakrishnan et al. | |
| 6,359,410 B1 | 3/2002 | Randolph | |
| 6,611,439 B1 | 8/2003 | Yang et al. | |
| 6,768,655 B1 * | 7/2004 | Yang et al. | 363/21.01 |
| 6,781,357 B2 | 8/2004 | Balakrishnan et al. | |
| 6,833,692 B2 | 12/2004 | Balakrishnan et al. | |
| 6,963,496 B2 | 11/2005 | Bimbaud | |
| 7,049,794 B2 | 5/2006 | Wong et al. | |
| 7,109,696 B2 | 9/2006 | Balakrishnan et al. | |
| 7,116,564 B2 | 10/2006 | Takahashi | |
| 7,161,815 B2 | 1/2007 | Mori | |
| 7,215,107 B2 | 5/2007 | Djenguerian et al. | |
| 7,218,086 B1 | 5/2007 | Ritter et al. | |
| 7,359,225 B2 * | 4/2008 | Djenguerian et al. | 363/97 |
| 7,394,669 B2 | 7/2008 | Fahlenkamp et al. | |
| 7,567,070 B2 * | 7/2009 | Djenguerian et al. | 323/285 |
| 2003/0132738 A1 | 7/2003 | Balakrishnan et al. | |
| 2005/0231986 A1 | 10/2005 | Kasprzak et al. | |
| 2006/0171175 A1 | 8/2006 | Zhu et al. | |

OTHER PUBLICATIONS

European Examination Report, EP 06253510, mailed Feb. 10, 2009, 8 pages.

* cited by examiner

METHOD AND APPARATUS TO LIMIT OUTPUT POWER IN A SWITCHING POWER SUPPLY

REFERENCE TO PRIOR APPLICATIONS

This application is a continuation of U.S. application Ser. No. 12/052,609, filed Mar. 20, 2008, now pending, which is a continuation of U.S. application Ser. No. 11/732,209, filed Apr. 2, 2007, which issued as U.S. Pat. No. 7,359,225 on Apr. 15, 2008, which is a continuation of U.S. application Ser. No. 11/179,144, filed Jul. 11, 2005, which issued as U.S. Pat. No. 7,215,107 on May 8, 2007.

BACKGROUND

1. Technical Field

The present invention relates generally to electronic circuits, and more specifically, the invention relates to switched mode power supplies.

2. Background Information

A typical requirement for power supplies of electronic equipment is that they limit their output power. One reason to limit output power is to meet the requirements of safety agencies for prevention of personal injury. Another reason to limit output power is to avoid damage to electronic components from an overload.

Power supplies typically have self-protection circuits that respond when an output becomes unregulated for a specified time. However, if output power is not limited, a fault at a load can consume enough power to cause damage or to exceed regulatory requirements while the outputs remain regulated. Thus, the self-protection feature can be ineffective if the power supply can deliver too much power.

A common way to limit output power of a switching power supply is to limit the current in a power switch at the input of the power supply. The maximum output power is related to the peak current in the switch. Inherent delays in the responses of electrical circuits create an error between the desired limit for peak current in the switch and the actual maximum peak current in the switch. The error is greater at higher input voltages, causing the maximum output power to be greater at higher input voltages than it is at lower input voltages.

BRIEF DESCRIPTION OF THE DRAWINGS

The present invention detailed illustrated by way of example and not limitation in the accompanying Figures.

DETAILED DESCRIPTION

Figure 1:
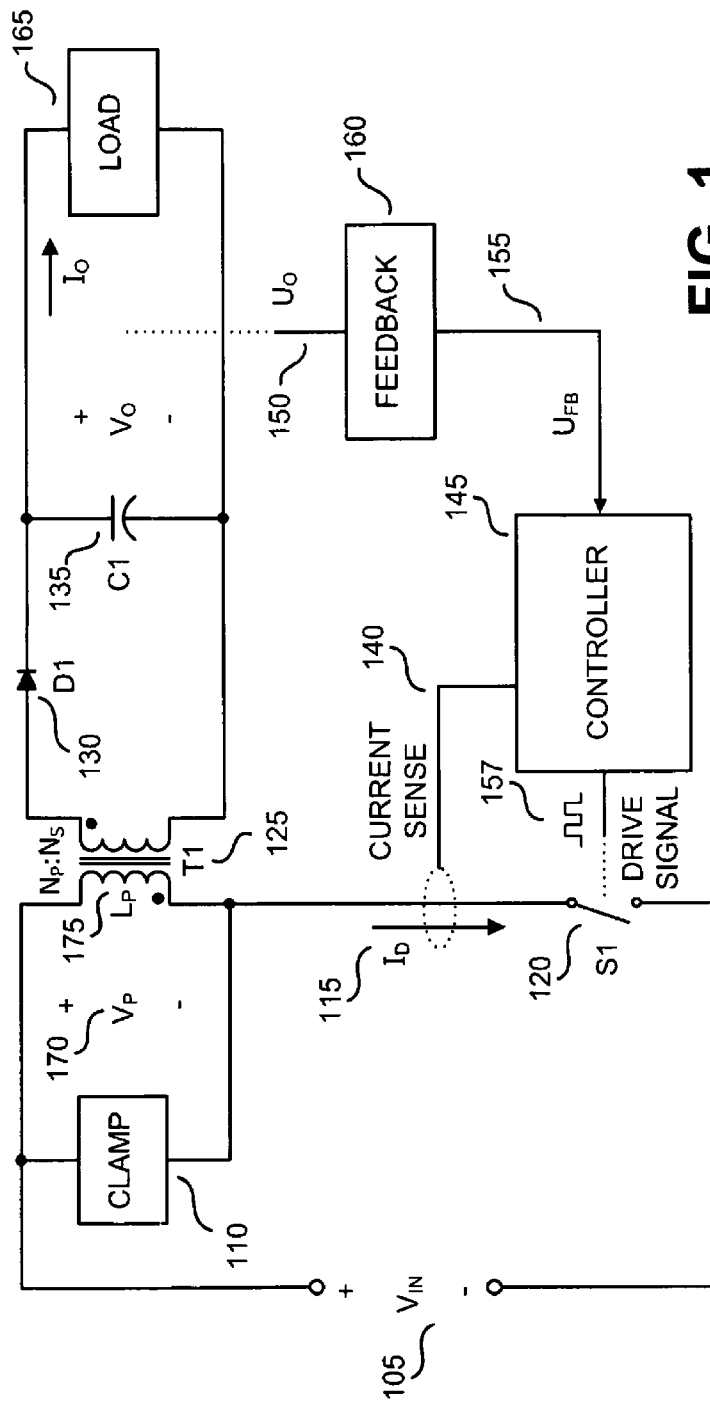
FIG. 1 is a functional block diagram of one embodiment of a switching power supply that may limit output power in accordance with the teaching of the present invention.
Figure 1:
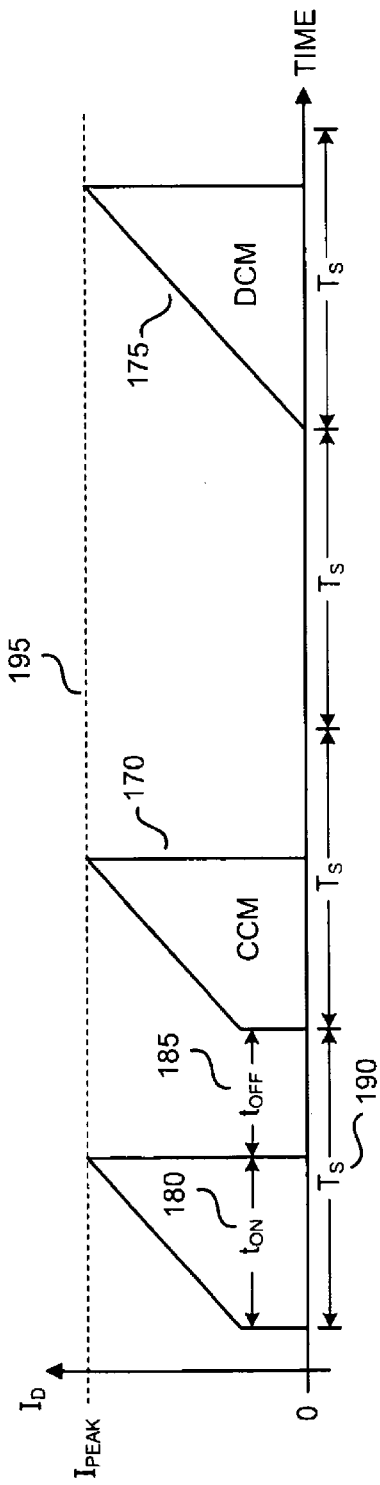

Embodiments of a power supply regulator that may be utilized in a power supply are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "for one embodiment" or "in an embodiment" in various places throughout this specification are not necessarily all referring to the same embodiment. Furthermore, the particular features, structures, or characteristics may be combined in any suitable manner in one or more embodiments.

As will be discussed, the power from a switching power supply may be limited according to embodiments of the present invention by limiting the current in a switch of the power supply. For one embodiment, a switch is coupled to an energy transfer element of a power supply with a controller generating a drive signal to control switching of the switch to regulate the output of the power supply. The controller includes a current limiter, which will adjust the drive signal to limit a current though the switch to a variable current limit value. For one embodiment, the current limiter based on the input line voltage of the power supply sets the variable current limit value. For example, the variable current limit may be to a nominal current limit value for nominal or a low input line voltage. If, however, the input line voltage is relatively high, then the variable current limit is set to a reduced current limit value in accordance with the teachings of the present invention. For one embodiment, the controller deduces the magnitude of the input voltage by measuring how long the current takes to go between two values and the variable current limit is then adjusted accordingly.

The variable current limit value for the switch is adjusted according to the input voltage of the power supply to compensate for a delay between the time when the current reaches the current limit and the time when the switch turns off. A lower value of current limit for higher input voltages prevents excess output power at high input voltage. For one embodiment, input voltage may be determined indirectly from a measurement of time to reach current limit from an initial value of zero current when the power supply operates in discontinuous conduction mode. In general, a design can deliver a required output power and also limit the maximum output power over the operating range of input voltage by compensating for the error between desired maximum peak current in the switch and the actual maximum peak current in the switch.

As will be discussed, a measurement of time is used to determine an appropriate adjustment of the desired maximum peak current in the switch to meet the requirements of the design. A current limit threshold for a switch is adjusted in response to a measurement of time during the conduction of the switch to compensate for the undesirable influence of input line voltage on the actual peak current in the switch. For instance, a relatively high input line voltage is indicated for an embodiment of the present invention if an over current condition is identified during a first switching cycle after a skipped switching cycle of the switch.

As will be discussed, it is likely that the power supply will operate in a discontinuous conduction mode of operation in the first switching cycle after a skipped switching cycle. In this situation, the energy in the energy transfer element typically goes to zero before the switch turns on in the next switching cycle. Therefore, if an over current condition occurs during this first switching cycle with the energy in the energy transfer element initially at zero at the beginning of the switching cycle, a high input line condition is indicated, and the variable current limit is set accordingly to the reduced value in accordance with the teachings of the present invention. If, on the other hand, an over current condition is not identified in the first switching cycle after a skipped switching cycle of the switch, then it is assumed that the input line voltage of the power supply is nominal or relatively low, and the variable current limit is set accordingly to the nominal value in accordance with the teachings of the present invention.

To illustrate, FIG. 1 shows a functional block diagram of a power supply that may include an embodiment of a method that limits peak switch current in accordance with the teachings of the present invention. The topology of the power supply illustrated in FIG. 1 is known as a flyback regulator. It is appreciated that there are many topologies and configurations of switching regulators, and that the flyback topology shown in FIG. 1 is provided to illustrate the principles of an embodiment of the present invention that may apply also to other types of topologies in accordance with the teachings of the present invention.

As illustrated in the power supply example of FIG. 1, an energy transfer element T1 125 is coupled between an unregulated input voltage $V_{IN}$ 105 and a load 165 at an output of the power supply. A switch S1 120 is coupled to the primary winding 175 at an input of energy transfer element 125 to regulate the transfer of energy from the unregulated input voltage $V_{IN}$ 105 to the load 165 at the output of the power supply. A controller 145 is coupled to generate a drive signal 157 that is coupled to be received by the switch S1 120 to control switching of switch S1 120. In the example of FIG. 1, the energy transfer element T1 125 is illustrated as a transformer with two windings. A primary winding 175 has $N_P$ turns with an inductance $L_P$. A secondary winding has $N_S$ turns. In general, the transformer can have more than two windings, with additional windings to provide power to additional loads, to provide bias voltages, or to sense the voltage at a load.

A clamp circuit 110 is coupled to the primary winding 175 of the energy transfer element T1 125 to control the maximum voltage on the switch S1 120. In one embodiment, switch S1 120 is a transistor such as for example a power metal oxide semiconductor field effect transistor (MOSFET). In one embodiment, controller 145 includes integrated circuits and discrete electrical components. The operation of switch S1 120 produces pulsating current in the rectifier D1 130 that is filtered by capacitor C1 135 to produce a substantially constant output voltage $V_O$ or a substantially constant output current $I_O$ at the load 165.

The output quantity to be regulated is $U_O$ 150, that in general could be an output voltage $V_O$, an output current $I_O$, or a combination of the two. A feedback circuit 160 is coupled to the output quantity $U_O$ 150 to produce a feedback signal $U_{FB}$ 155 that is an input to the controller 145. Controller 145 also includes a current sensor coupled to receive current sense 140 that senses a current $I_D$ 115 in switch S1 120. Any of the many known ways to measure a switched current, such as for example a current transformer, or for example the voltage across a discrete resistor, or for example the voltage across a transistor when the transistor is conducting, may be used to measure current $I_D$ 115. The controller may use current sense signal 140 to regulate the output $U_O$ 150 or to prevent damage to the switch S1 120.

FIG. 1 also shows an example waveform for current $I_D$ 115. During any switching period $T_S$ 190, switch S1 120 may conduct in response to drive signal 157 from controller 145 to regulate the output $U_O$ 150. When current $I_D$ 115 reaches a current limit value $I_{PEAK}$ 195 after a time $t_{ON}$ 180 from the beginning of the switching period $T_S$ 190, switch S1 120 turns off and stays off for a time $t_{OFF}$ 185, which is the remainder of the switching period $T_S$ 190. The current waveform shows two fundamental modes of operation. The trapezoidal shape 170 is characteristic of continuous conduction mode (CCM) whereas the triangular shape 175 is characteristic of discontinuous conduction mode (DCM).

Figure 2:
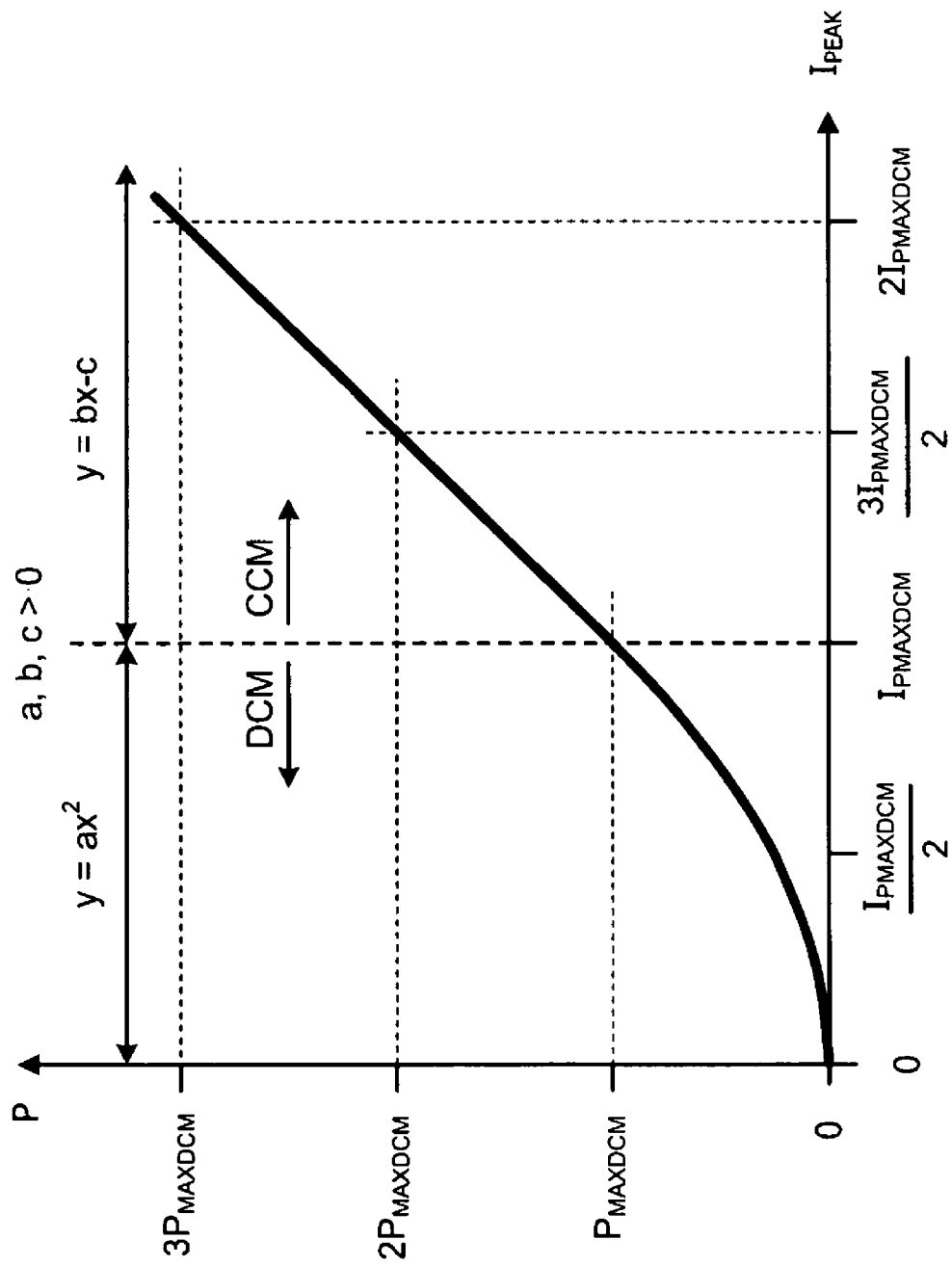
FIG. 2 is a graph of power capability for one embodiment of a switching power supply with respect to the peak current of the switch.

FIG. 2 shows how the peak current $I_{PEAK}$ 190 is related to the maximum output power of the power supply in FIG. 1. In DCM, the output power increases as the square of $I_{PEAK}$. In CCM, the output power increases linearly with $I_{PEAK}$. The current limit value $I_{PEAK}$ is used to help limit the output power of the power supply. A difficulty in limiting the current limit value $I_{PEAK}$ is that there is always a delay between the time when the current reaches the limit and the time the switch turns off.

Figure 3:
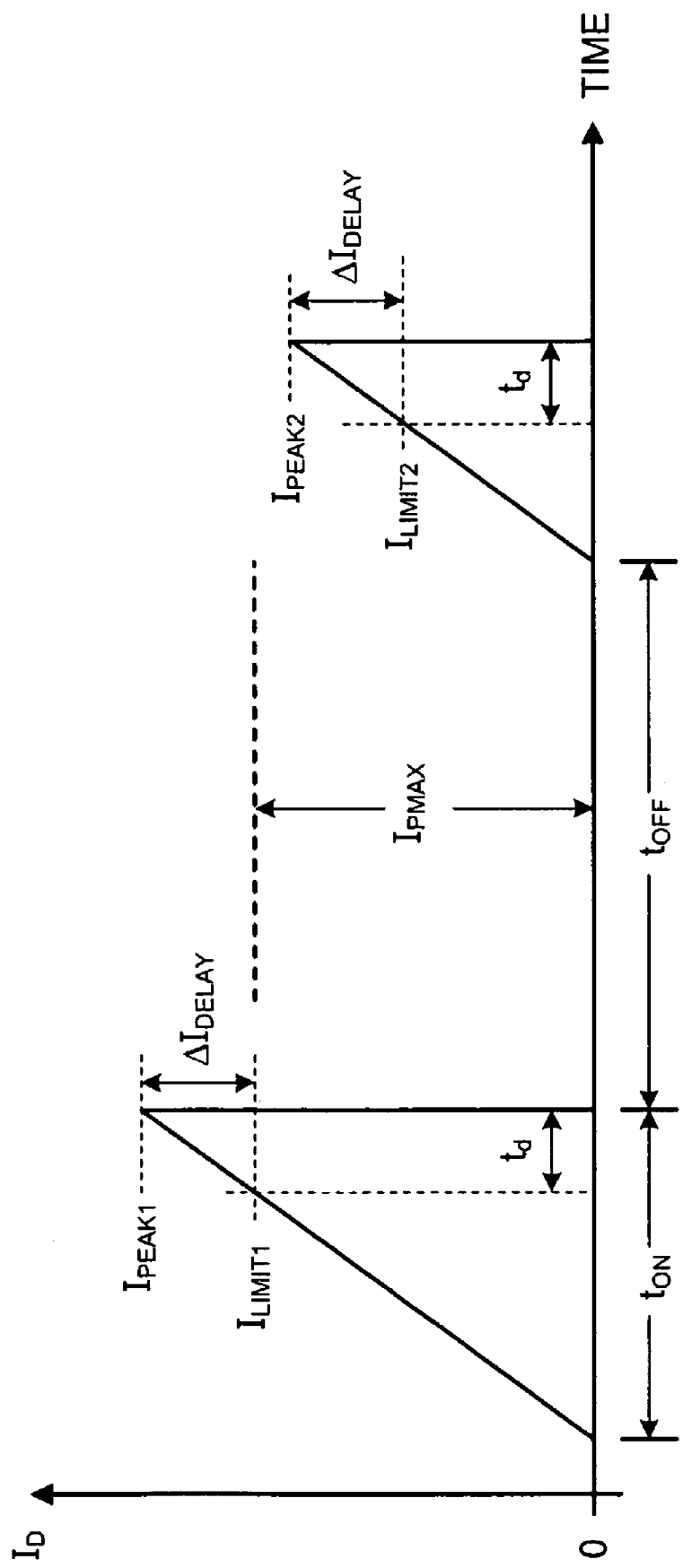
FIG. 3 shows waveforms of the current in the switch for one embodiment of a switching power supply in accordance with the teaching of the present invention.

To illustrate, FIG. 3 shows how a delay influences peak current in the switch. In the example illustrated in FIG. 3, $I_{PMAX}$ is the maximum desired value for $I_D$. A controller having a current limit threshold $I_{LIMIT1}$ that is the same value of $I_{PMAX}$ takes action to turn off the switch when $I_D$ exceeds $I_{LIMIT1}$. The unavoidable time delay $t_d$ allows $I_D$ to exceed $I_{LIMIT1}$ by an amount $\Delta I_{DELAY}$ that depends on the delay $t_d$ and on how fast $I_D$ is changing after it passes $I_{LIMIT1}$. A current limit $I_{LIMIT1}$ produces a peak current $I_{PEAK1}$ that is greater than the desired $I_{PMAX}$. If the delay $t_d$ and the rate of change of $I_D$ are known, the current limit can be compensated to a lower value $I_{LIMIT2}$ such that addition of $\Delta I_{DELAY}$ will give a peak current $I_{PEAK1}$ that is less than $I_{PMAX}$.

A complication in the use of a lower current limit value to compensate for the delay is that in general $\Delta I_{DELAY}$ will be larger at higher input voltages than at lower input voltages because $I_D$ increases at a greater rate when the input voltage is high. Therefore, a power supply that uses a single compensated current limit $I_{LIMIT2}$ to limit maximum output power to the desired value at a high input voltage would have less than the desired maximum output power at low input voltage. Indeed, if the circuit to limit the power has only one desired limit for peak current such as $I_{PEAK2}$, a design that meets the requirement for maximum power at high input voltage may be unable to deliver the required power at low input voltage.

For one embodiment, a power supply may use a first compensated current limit $I_{LIMIT1}$ at a low input voltage and a second compensated current limit $I_{LIMIT2}$ at high input voltage to limit the maximum output power to a desired value over a wide range of input voltages in accordance with the teachings of the present invention.

Figure 4:
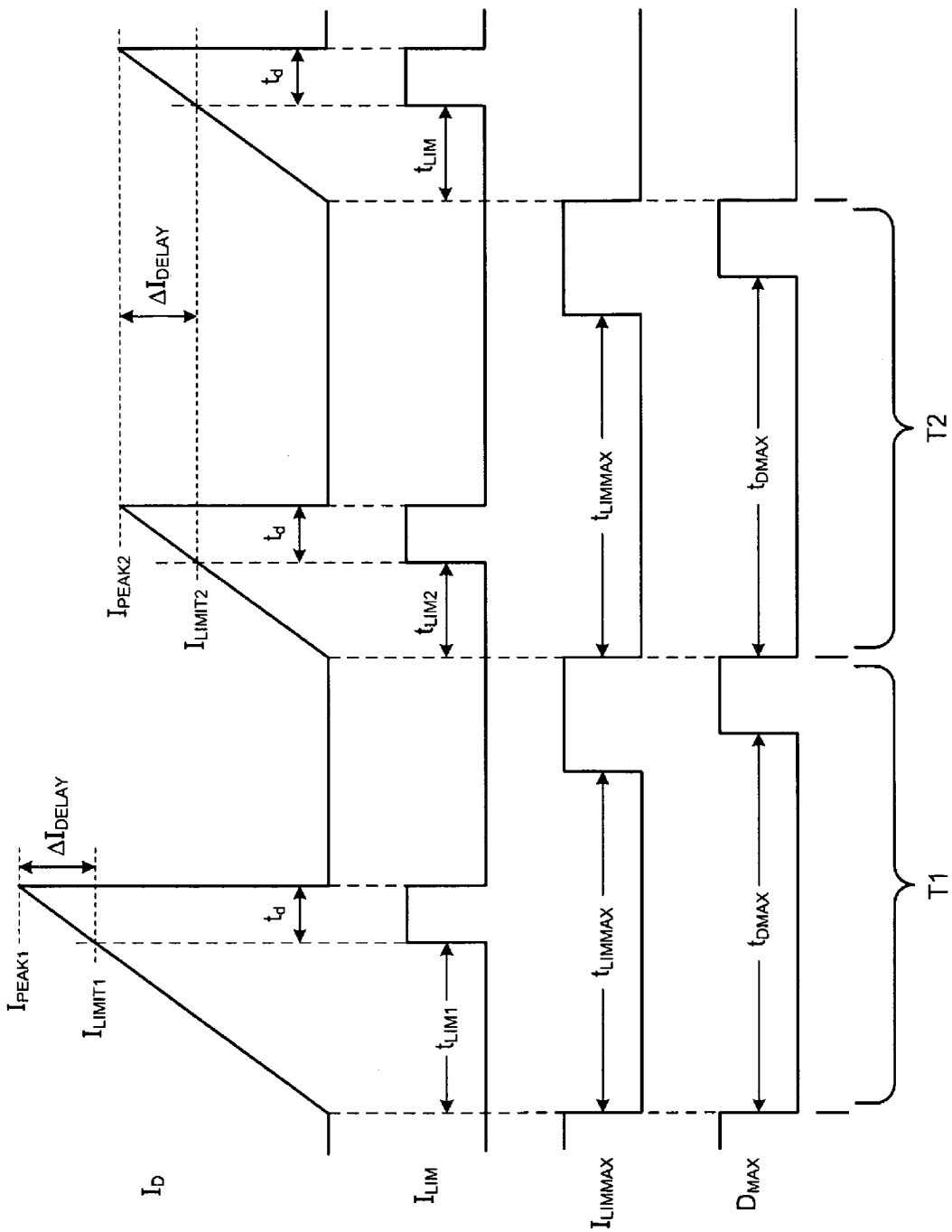
FIG. 4 shows parameters of timing signals with parameters of the current in a switch of a power supply that may limit output power in accordance with the teaching of the present invention.

To illustrate, FIG. 4 shows example timing signals that are used with the current $I_D$ for one embodiment of the invention to determine whether the current limit will be $I_{LIMIT1}$ or $I_{LIMIT2}$. In particular, FIG. 4 shows two full switching periods, T1 and T2 of switch current $I_D$ with timing signals $I_{LIM}$, $I_{LIMMAX}$, and $D_{MAX}$. In FIG. 4, current limit signal $I_{LIM}$ is high whenever $I_D$ is greater than the current limit. Signal $I_{LIMMAX}$ is a timing reference that is compared to current signal $I_{LIM}$ to determine whether the current limit will be $I_{LIMIT1}$ or $I_{LIMIT2}$. Signal $D_{MAX}$ sets the maximum on time of the switch. The switch is forced off when $D_{MAX}$ is high.

Figure 5:
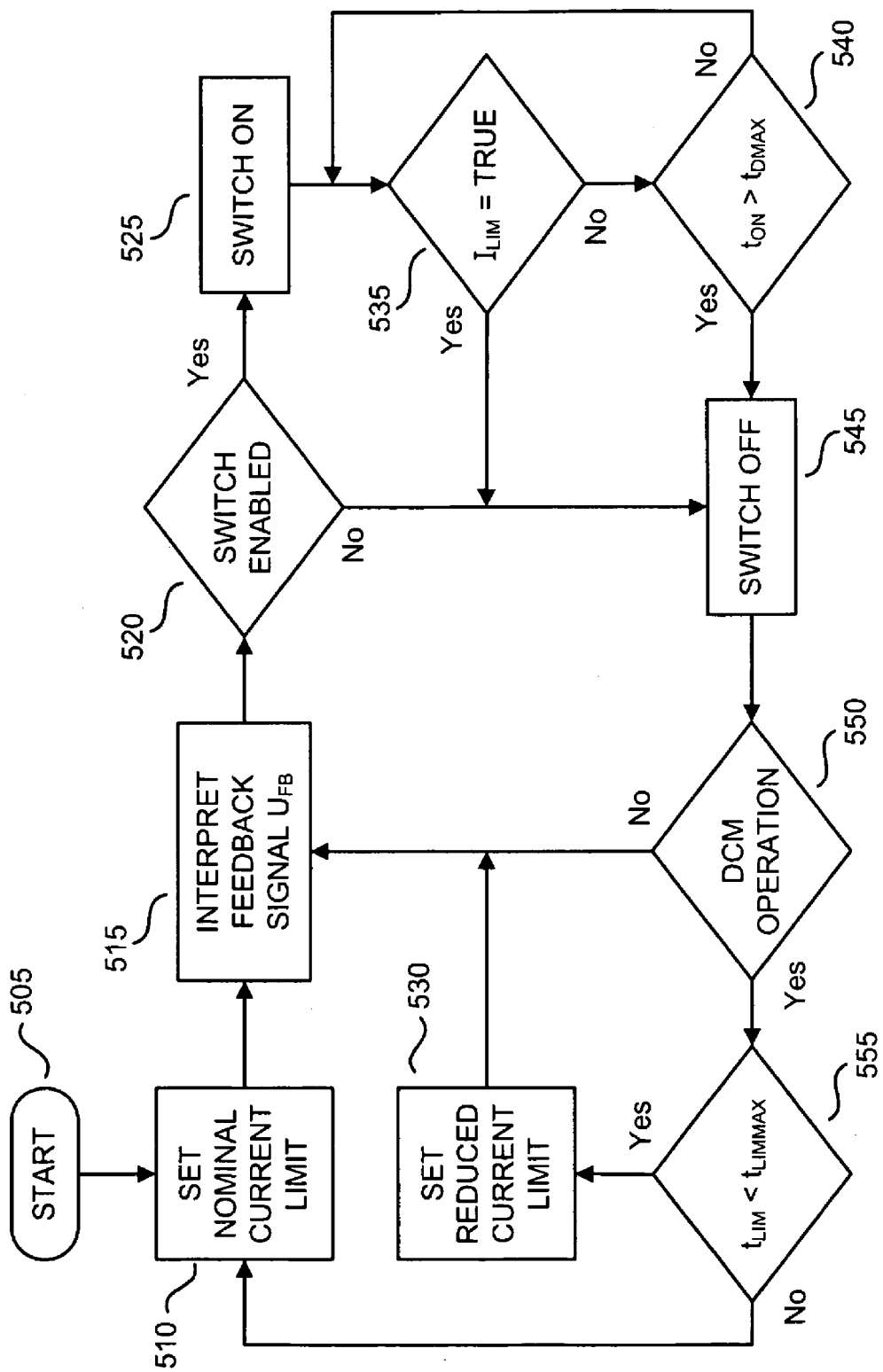
FIG. 5 is a flow diagram that illustrates a method to limit output power of a switching power supply in accordance with the teaching of the present invention.

FIG. 5 is a flow diagram for one embodiment of a power supply controller that uses the timing signals of FIG. 4 in accordance with the teachings of the present invention. The flow starts at Block 505 when the switch is off. Block 510 sets a nominal current limit, which for one embodiment corresponds to $I_{LIMIT1}$ in FIG. 4, and is more suitable for a nominal or low input voltage. Block 515 interprets feedback signal $U_{FB}$ to determine whether the switch should turn on or remain off in the next switching period. If the switch is enabled, then Block 520 directs the switch to turn on in Block 525. If the switch is not enabled, then Block 520 directs the switch to be off in Block 545.

Once the switch is turned on, the state of the current limit signal $I_{LIM}$ is evaluated in Block 535. The on time of the switch is compared to the maximum permissible on time in Block 540. Block 545 turns off the switch immediately if $I_{LIM}$ is high or if the on time exceeds the maximum on time $t_{DMAX}$. After the switch turns off, Block 550 directs the flow depending on whether the mode of operation was CCM or DCM when the switch turned on. The mode is DCM if the energy in the energy transfer element goes to zero before the switch turns on. In one embodiment, a single switching period with the switch disabled is sufficient to reduce the energy to zero. Therefore, in one embodiment, Block 550 has a memory of whether or not the switch was enabled during a previous switching period to determine the mode of operation at the start of the present switching period.

If the mode of operation was not DCM, the controller continues with the interpretation of the feedback signal in Block 515. If the mode of operation was DCM, the flow is diverted to Block 555. Block 555 compares the time to reach current limit against the reference time $t_{LIMMAX}$. Although delays in practical circuits prevent exact measurement of the time $t_{LIM}$ to reach the current limit, it is sufficient to measure a signal that includes the delays for an approximate measurement of $t_{LIM}$. For one embodiment, the sum of $t_{LIM}$ and delay $t_d$, which is the on time $t_{ON}$ in FIG. 3, is measured in Block 555 as an approximation to $t_{LIM}$ for comparison against the reference time $t_{LIMMAX}$. When the operation is in DCM, the current can reach current limit in less time than $t_{LIMMAX}$ only if the input voltage is high in accordance with the teachings of the present invention.

If the time to reach current limit is less than $t_{LIMMAX}$, the controller sets a reduced current limit in Block 530. The reduced current limit for a high input voltage corresponds to $I_{LIMIT2}$ in FIG. 4. If the time to reach current limit is not less than the reference time $t_{LIMMAX}$, then the controller sets the nominal current limit in Block 510. The latter condition is also true when the switch turns off before the current reaches current limit, causing the controller to set the nominal current limit in Block 510.

Figure 6:
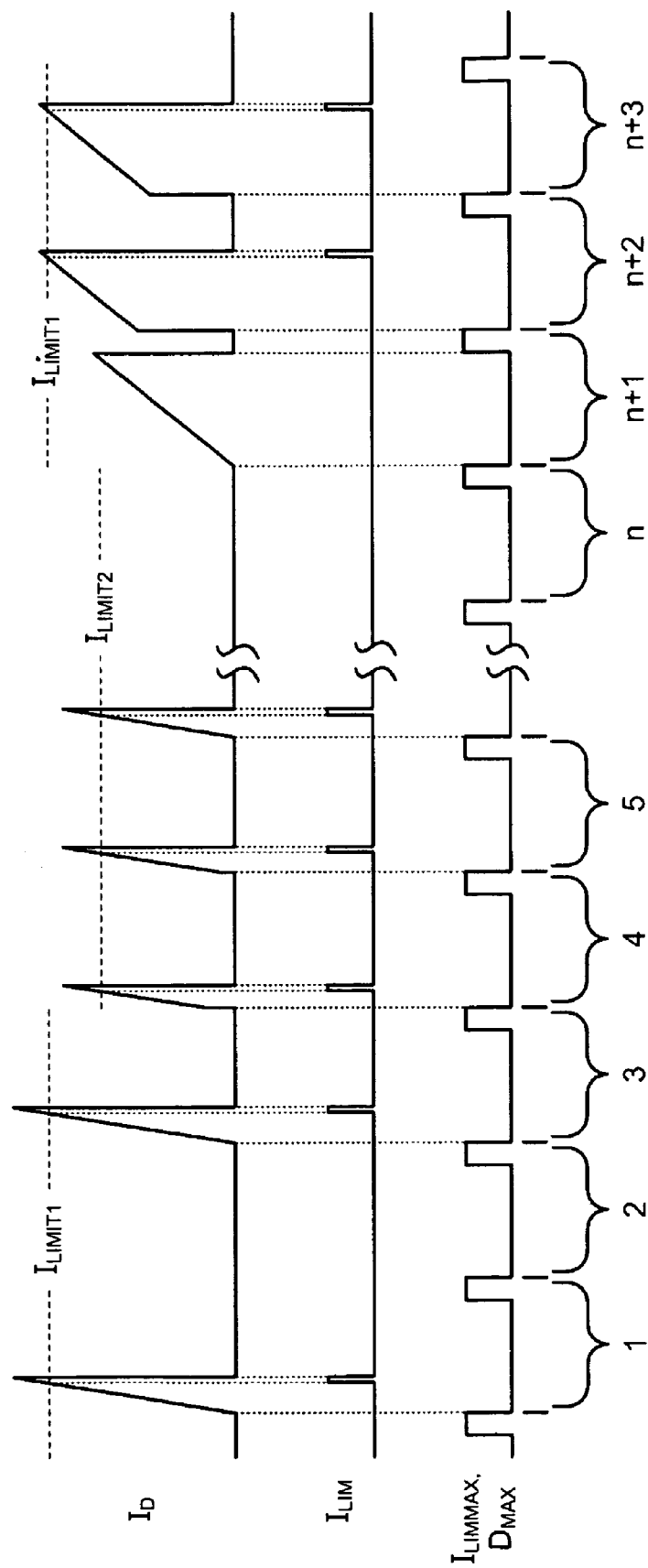
FIG. 6 shows timing signals with waveforms of the current in a switch of a switching power supply to illustrate operation of one embodiment of the present invention.

FIG. 6 shows several switching periods that illustrate operation according to the flow diagram of FIG. 5. In Period 1, the switch operates at a high input voltage when the current limit has been set at the nominal value $I_{LIMIT1}$ that is appropriate for a nominal or low input voltage. The surplus energy from the high peak current at the high input voltage causes the controller to disable the switch in Period 2. The controller detects a high input voltage condition from the short time to reach current limit in Period 3, and sets the reduced current limit $I_{LIMIT2}$ in Period 4. The operation continues with the reduced current limit until the controller detects a period of DCM operation where the time to reach current limit is not less than the reference time $t_{LIMMAX}$. In Period n, the switch is disabled and the input voltage is low. The controller has determined that the time to reach current limit in a period of DCM was not less than the reference time $t_{LIMMAX}$. Consequently, the controller sets the current limit to the nominal value $I_{LIMIT1}$ in Period (n+1). The current does not reach current limit in Period (n+1) so the switch is turned off by maximum on time and the current limit remains at $I_{LIMIT1}$. The power supply operates in CCM at low input voltage and current limit $I_{LIMIT1}$ in Period (n+2) and Period (n+3).

Figure 7:
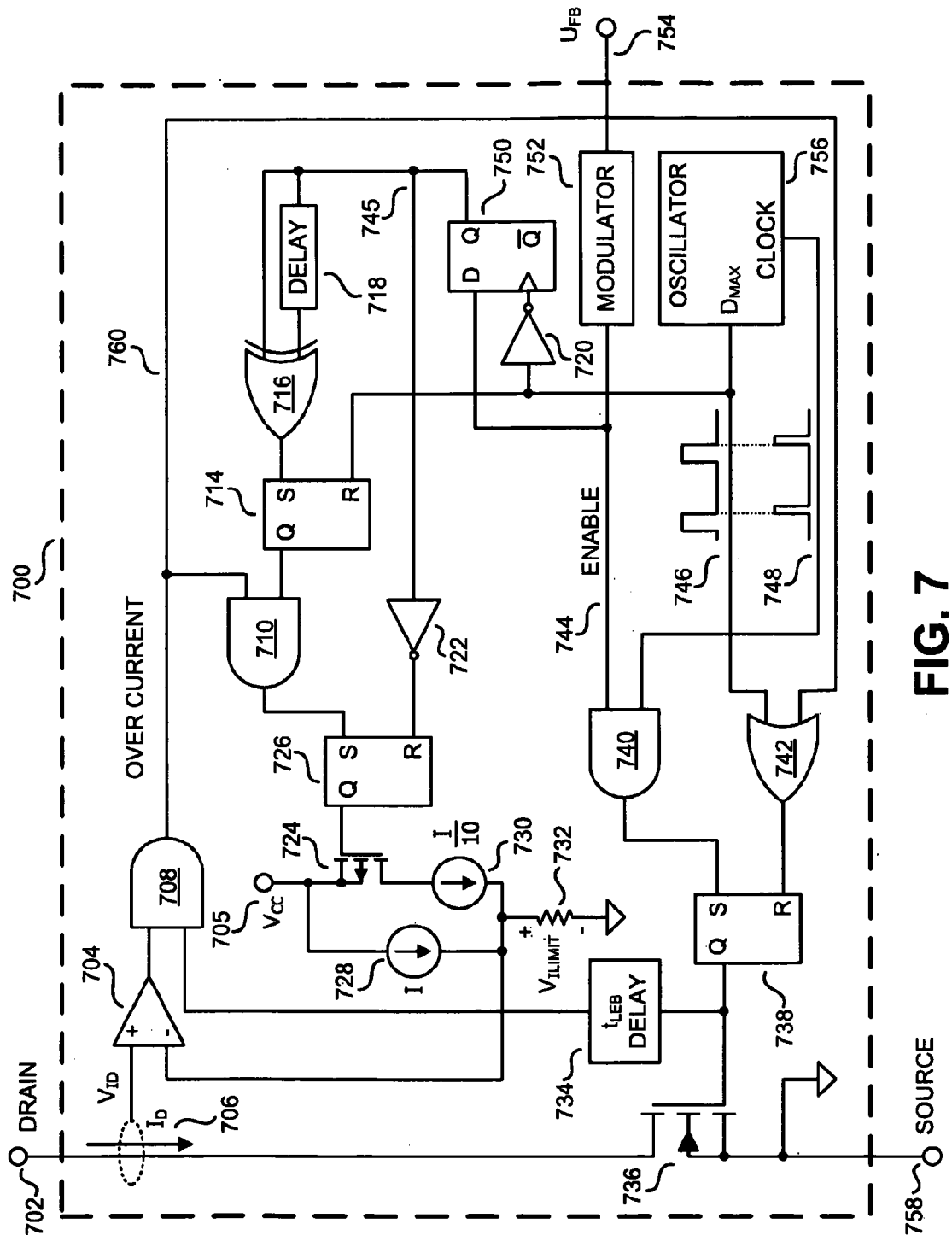
FIG. 7 is a functional block diagram of one embodiment of the present invention that includes the power switch in an integrated circuit.

FIG. 7 shows one embodiment that includes a power switch 736 in an integrated circuit 700. Power switch 736 is a MOSFET that conducts current between a drain terminal 702 and a source terminal 758. Circuits internal to the integrated circuit are powered from an internal voltage $V_{CC}$ 705 that is referenced to source terminal 758. For one embodiment, drain terminal 702 provides internal voltage $V_{CC}$ 705. Internal voltage $V_{CC}$ may be provided from drain terminal 702 or from a different terminal of the integrated circuit by several techniques that are known to one skilled in the art.

A feedback terminal 754 receives a feedback signal $U_{FB}$. A modulator 752 interprets the feedback signal $U_{FB}$ to set an enable signal 744 high or low. An oscillator 756 provides a clock signal 748 and a $D_{MAX}$ signal 746 to determine respectively the length of a switching period and the maximum on time of the switch 736. Switch 736 may be on while $D_{MAX}$ 746 is low. Switch 736 is off while $D_{MAX}$ 746 is high. AND gate 740 sets latch 738 to turn on switch 736 with drive signal 757 at the beginning of a switching period if the enable signal 744 is high. OR gate 742 resets latch 738 to turn off switch 736 with drive signal 757 if switch current $I_D$ 706 exceeds the current limit or if signal $D_{MAX}$ 746 goes high.

Switch current $I_D$ 706 is sensed as a voltage $V_{ID}$ that is compared to a current limit voltage $V_{ILIMIT}$ by a comparator 704. Resistor 732 with current sources 728 and 730 generates current limit voltage $V_{ILIMIT}$. Current source 730 is switched on and off by p-channel transistor 724. In one embodiment, current source 730 is one-tenth the value of current source 728. Thus, the current limit voltage $V_{ILIMIT}$ increases by 10 percent to make a nominal current limit 10 percent higher than a reduced current limit when current source 730 is switched on.

The drive signal 757 that is output by latch 738 is delayed by leading edge blanking time $t_{LEB}$ delay 734 before being received by AND gate 708. AND gate 708 receives the output of current limit comparator 704 and the output of leading edge blanking time delay 734 to provide an over current signal 760. Leading edge blanking time $t_{LEB}$ delay 734 is long enough to allow switch 736 to discharge stray capacitance on drain terminal 702. Discharge of stray capacitance at drain terminal 702 can produce a high drain current $I_D$ 706 that temporarily exceeds the current limit, but is unrelated to the output of the power supply. The leading edge blanking time $t_{LEB}$ delay 734 prevents the over current signal 760 from going high during a time $t_{LEB}$ after switch 736 turns on. Over current signal 760 in FIG. 7 corresponds to signal $I_{LIM}$ in FIG. 4 or FIG. 6.

Flip-flop 750 remembers the state of enable signal 744 at the beginning of the switching period. Flip-flop 750 is clocked at the start of every switching period by the complement of $D_{MAX}$ signal 746 from inverter 720. A change in the state of the clocked enable signal 745 from one switching period to the next switching period is detected by XOR gate 716.

XOR gate 716 with delay 718 at one input receives the clocked enable signal 745 to set latch 714 whenever there is a change in the clocked enable signal 745. Delay 718 is long enough to produce an output that sets latch 714. In one embodiment, delay 718 is ten nanoseconds. Latch 714 is set at the beginning of a switching period whenever there has been a change in the state of the clocked enable signal 745 from the previous switching period.

Latch 726 is allowed to set if enable signal 744 is high at the beginning of the current switching period. Inverter 722 resets latch 726 if enable signal 744 is low at the beginning of the current switching period.

Latch 714 is set to indicate DCM operation in the present switching period. DCM is indicated when the output of latch 714 is high. Latch 726 is set to reduce the current limit.

In the embodiment of FIG. 7, the maximum on time signal $D_{MAX}$ 746 is also the timing reference that is compared to over current signal $I_{LIM}$ 760 to determine whether the current limit will be $I_{LIMIT1}$ or $I_{LIMIT2}$. In the embodiment of FIG. 7, $t_{LIMMAX} = t_{DMAX}$, representing an embodiment where the signals $I_{LIMMAX}$ and $D_{MAX}$ of FIG. 4 are identical. For another embodiment, however, it is appreciated that $t_{LIMMAX}$ does not necessarily have to equal $t_{DMAX}$ in accordance with the teachings of the present invention, such as the example illustrated in FIG. 4. Latch 726 will not be set if there is no over current condition detected or the current limit is not reached during the time when $D_{MAX}$ 746 is low. Thus, current source 730 remains switched on by transistor 724 if the over current condition is not detected in accordance with the teachings of the present invention.

It is appreciated that although FIG. 7 illustrates an integrated circuit 700 for an example of the present invention that employs a switching regulator that may skip switching cycles of power switch 736 in response to enable signal 744, other examples of integrated circuits may also be covered in accordance with the teachings of the present invention. For example, a pulse width modulated (PWM) regulator circuit may also be covered in accordance with the teachings of the present invention. For instance, an example PWM controller deduces the magnitude of the input voltage by measuring how long the current takes to go between two values and then adjusts the variable current limit in accordance with the teachings of the present invention.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A power supply regulator, comprising:
   a comparator having first and second inputs and an output, the first input of the comparator adapted to sense a current flow through a switch, the second input of the comparator adapted to sense a variable current limit value; and
   a controller coupled to the output of the comparator and to the switch to control switching of the switch to regulate an output of a power supply in response a feedback signal, wherein the controller disables the switch if the sensed current flow through the switch is greater than the sensed variable current limit value, wherein the variable current limit value is set to a first variable current limit value by the controller in response to an input line voltage of the power supply if there is not an over current condition during a first switching cycle that occurs after a skipped switching cycle of the switch, and wherein the variable current limit value is set to a second variable current limit value by the controller in response to the input line voltage if there is the over current condition during the first switching cycle that occurs after the skipped switching cycle, wherein the over current condition occurs when the current through the switch exceed the variable current limit value before a maximum on time of the switch occurs during a switching cycle of the switch, and wherein the first variable current limit value is greater than the second variable current limit value.

2. The power supply regulator of claim 1, wherein the first current limit value corresponds to a nominal or relatively low input line voltage of the power supply.

3. The power supply regulator of claim 1, wherein the second current limit value corresponds to a relatively high input line voltage of the power supply.

4. The power supply regulator of claim 1, wherein the first switching cycle that occurs after the skipped switching cycle of the switch corresponds to a discontinuous conduction mode of operation of the power supply.

5. The power supply regulator of claim 1, wherein energy in an energy transfer element of the power supply goes to zero during the skipped switching cycle of the switch.

6. The power supply regulator of claim 1, further comprising an integrated circuit including the controller.

* * * * *